Patented Dec. 8, 1936

2,063,594

UNITED STATES PATENT OFFICE 2,063,594

SULPHURIC ACID ESTERS OF INDANTHRONE

David Alexander Whyte Fairweather, Falkirk, and John Thomas, deceased, late of Polmont, Scotland, by Olive Morgan Thomas, Wilmslow, England, and Barclays Bank Limited, Manchester, England, executors, assignors to Imperial Chemical Industries Limited, a corporation of Great Britain No Drawing. Original application April 16, 1931, Serial No. 530,724. Divided and this application June 10, 1935, Serial No. 25,939. In Great Britain April 16, 1930

4 Claims. (Cl. 260—31)

This invention relates to the preparation of new disulphuric acid esters of reduced indanthrone, and more particularly to the azine disulphuric esters of indanthrone which are obtainable by the controlled hydrolysis of the tetrasulphuric acid esters of dianthrahydroquinoneazine or dihydroazine.

This application is a division of the copending application Ser. No. 530,724, filed April 16, 1931 (U. S. Patent 2,019,530, November 5, 1935).

In U. S. Patent 1,976,689, October 9, 1934, the inventors have described the preparation of a tetrasulphuric acid ester of dianthrahydroquinoneazine having the probable formula:

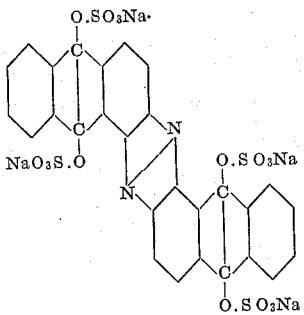

They now find that when this azine tetra-ester is warmed gently, e. g., at 40° C., for a short time with alkaline hydrosulphite, it is converted into a new tetra-ester, which reverts to the azine tetra-ester when exposed to the oxidizing action of the air. This reduced compound is probably the tetrasulphuric acid ester of dianthrahydroquinone dihydroazine, that is, the tetrasulphuric acid ester of the "normal" leuco 1,2,2′,1′-dianthraquinone dihydroazine.

If on the other hand what they have called the azine tetra-ester be subjected to a rather more severe treatment, for example, by warming to 60° C. with alkaline hydrosulphite, they obtain another new ester which does not revert to the azine tetra-ester when exposed to air, but yields instead a substance which appears to be a trisulphuric ester of dianthrahydroquinoneazine.

This same tri-ester, or a substance closely resembling it, may also be obtained by careful treatment of the azine tetra-ester with acid.

This new tri-ester is surprisingly stable, being capable of isolation in the dry state, and of being evaporated in alkaline solution with little or no decomposition. It is less soluble in water than the azine tetra-ester, dissolves in water with a red color which becomes purple on addition of excess of caustic alkali. It has affinity for vegetable and animal fibers. Towards mineral acids and acid oxidants it behaves in much the same way as the azine tetra-ester; for example, with hydrochloric acid it gives a deep blue color, gradually changing to purple and finally to red, the known di-ester of dianthraquinone dihydroazine being the end-product.

By a still stronger treatment of the azine tetra-ester with alkaline hydrosulphite, they have obtained another new substance, which appears to be the tri-ester of a hydroazineanthranol, derived possibly by the reduction of one of the four esterified hydroxyl groups (see formula above) to hydrogen.

Still stronger treatment with alkaline hydrosulphite, or preferably with acid reducing agents, converts the azine tetra-ester into a di-ester, which appears to be identical with the product obtained by oxidation of the ester of 2-aminoanthranol, as described in their copending U. S. application Ser. No. 463,562, Patent No. 1,970,083, August 14, 1934. This di-ester is probably a hydroazine-di-anthranol ester, produced by reduction of two esterified hydroxyl groups to hydrogen. It is brown in color, very soluble in water, and apparently yields a dianthranol azine on hydrolysis.

Finally they have converted the azine tetra-ester by the action of alkaline hydrolytic agents, e. g., hot caustic soda solution, into a new di-ester. This new compound is brown red in color, and gives at once a blue substance when treated with cold dilute mineral acid. It is possibly the di-ester of a dianthrahydroquinone azine, formed by hydrolysis of two of the ester groups to hydroxyl groups. It is reducible in the cold by zinc and dilute acetic acid to a bright red solution, which when made alkaline and shaken with air becomes brown and then contains apparently the di-ester of a dianthranol azine. The new di-ester is surprisingly stable to evaporation over a naked flame. Though less soluble in water than the azine tetra-ester, it is much more soluble than the di-ester of anthraquinone-anthrahydroquinone hydroazine. When the new di-ester is made by the hot alkali method there is also formed a small amount of an indanthrone by complete hydrolysis and oxidation. The new di-ester may also be obtained by hydrolysis of the tri-ester of dianthrahydroquinone azine.

In the foregoing the inventors have confined the description to indanthrone itself and its reduction products and esters. It will be evident, however, that similar reasoning applies to substituted indanthrones, their reduction products and the esters derived from them. Symmetrically substituted indanthrones, e. g., 3,3'-dichloroindanthrone, will give rise to a similar number and variety of esters as indanthrone itself. With unsymmetrically substituted indanthrones the number of different esters will of course be even greater.

The inventors have found, for example, that an important and valuable new ester may be derived from 3,3'-dichloroindanthrone. As starting material for the new ester they use the tri-ester of 3,3'-dichloroindanthrone obtainable by alkaline oxidation of the disulphuric ester of 3-chloro-2-aminoanthrahydroquinone followed by treatment of the resulting tetra-ester with alkaline hydrosulphite under mild conditions, or preferably with dilute acid, so as to give what is probably the tri-ester of 3,3'-dichlorodianthrahydroquinone azine. They have found that this starting material, i. e., what they have called the tri-ester, is converted by alkaline oxidizing agents (e. g., bleach liquor or alkaline potassium persulphate) into a remarkable new compound, which for convenience shall be referred to as an azine di-ester. This new product has affinity for vegetable and animal fibers. Thus cotton is dyed in reddish shades, which exhibit the remarkable property of changing at once to full blue dyeings when brought into contact with acid, e. g., 0.5 per cent hydrochloric acid, without the necessity for an oxidant to be present; i. e., treatment with acid alone suffices for the formation of the color. This remarkable property is possibly due to a peculiarity in the constitution of the new ester, which enables the hydrolyzed ester groups to be dehydrogenated by the taking up of hydrogen by the azine nitrogen atoms. It appears, therefore, that for the first time a vat dye sulphuric ester has been produced which may be regarded as acting as its own oxidizing agent.

Similar azine di-esters showing the same remarkable property are obtainable from tri-esters of dianthrahydroquinone azine itself and of other substituted dianthrahydroquinone azines, by the action of alkaline oxidants.

The invention is illustrated but not limited by the following specific examples, in which the parts are by weight.

*Example 1*

300 parts are taken of a saturated aqueous solution of the ester prepared, for instance, according to Example 16 of U. S. application Ser. No. 433,498, (U. S. Patent No. 1,976,689, October 9, 1934) by oxidizing the potassium salt of the disulphuric ester of β-amino-anthrahydroquinone with sodium hypochlorite in the presence of caustic soda, evaporating the resulting solution, fractionally precipitating with potassium chloride, redissolving the comparatively pure ester obtained in water, and precipitating with ethyl alcohol. This solution is stirred at 60° C. with 120 parts of 20 per cent caustic soda solution, and 50 parts of zinc dust for half an hour. The solution gradually acquires a brown-red color. It is filtered from zinc residues and saturated with sodium chloride. The new body which is thus salted out is orange-red in color, dissolving in water to give a solution of similar color.

It appears to be the trisulphuric ester of anthrahydroquinone-anthranol hydroazine, having the probable formula:

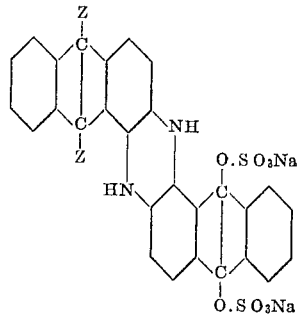

wherein one Z represents O.SO₃Na and the other represents H.

*Example 2*

The product obtained in the previous example is dissolved in 250 parts of water, and 2 parts of caustic soda, and 50 parts of 10 per cent hypochlorite liquor. The mixture is stirred for 10 minutes at 50° C. and any excessive hypochlorite removed by the addition of sodium sulphite. The product obtained is apparently a di-ester having the probable formula:

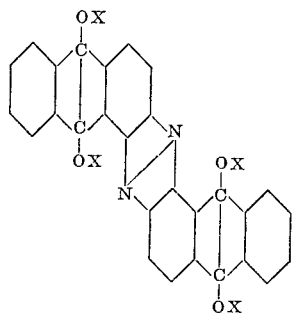

wherein two of the four X's represent H and the other two represent SO₃Na.

*Example 3*

1 part of the product obtainable by Example 1 is dissolved in 100 parts of water; the temperature is raised to about 60° C. and 10 parts of cotton yarn entered and kept at about 60° for half an hour, salt being added to assist exhaustion. The yarn is dyed a bright orange-red. It is removed, and immersed in a bath containing 1 per cent hydrochloric acid at 50 or 60° C. for a few minutes.

*Example 4*

This is similar to Example 3, except that the product obtained by Example 2 is used. The product dyes in orange-red shades converted by acid treatment to blue.

*Example 5*

This deals with the treatment of the body which they call the tetra-ester with a reducing agent.

800 parts of faintly alkaline aqueous paste containing 20 parts of indanthrone in the form of the tetra-ester are heated to 60° C. When the ester is dissolved completely, 10 parts of sodium hydrosulphite (82 per cent purity) and 24.5 parts of 20 per cent caustic soda are dissolved in 100 parts of water and added to the first solution with good stirring. The whole is stirred, preferably in an inert atmosphere, for 2 to 3 hours, and becomes gradually redder and darker in color.

The mixture is filtered from any impurity, which occasionally also contains a little of what appears to be the disulphuric acid ester of anthraquinone anthrahydroquinone hydroazine, and the filtrate is saturated with common salt. The reddish precipitate is filtered off, and may be purified from any starting material by redissolving in water containing a little alkali and resalting.

The dark reddish paste, which appears to be the trisulphuric acid ester of dianthrahydroquinoneazine, having the following probable formula:

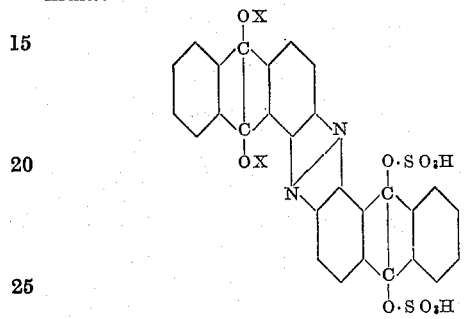

(wherein one of the X's represents H and the other represents SO₃Na), dissolves in water with a reddish orange color and on dilution the color goes to a salmon pink. It gives a deep violet color with excess of alkali and with acid turns blue and finally purplish due to the formation of what is apparently the di-ester. The body has fair affinity for cotton.

*Example 6*

This example describes a further method of obtaining the same tri-ester obtained in Example 5.

A faintly alkaline solution of the potassium salt of the tetra-ester of concentration 5 parts per thousand is stirred at 15° C. and acidified with a 20 per cent solution of acetic acid until the whole liquor contains 0.4 per cent of acetic acid. The color rapidly changes to a bright orange red, and the reaction is complete in about 5 minutes. The liquor is then made alkaline and evaporated to a fifth of its volume. The product is salted out with potassium chloride and filtered off. The cake is redissolved in warm water, filtered from a little di-ester and the product salted out again from the filtrate.

This body is apparently identical with the product obtained in Example 5.

*Example 7*

This is an example of the treatment of the tetra-ester of tetra-hydro-dianthraquinone azine with caustic soda.

100 parts of a solution of the potassium salt of the tetra-ester of 4 per cent strength is boiled with 20 parts of caustic soda for 1 to 2 hours, the liquor being allowed to concentrate by escape of steam. The color of the solution becomes brown during the reaction and the reaction is finished when a test portion of the liquor gives on treatment with dilute hydrochloric acid a pure blue precipitate (not red). The liquor is then diluted with twice its volume of saturated salt solution and filtered cold, or the cold liquor may be filtered without dilution. The filter cake is dissolved in warm water and the solution is filtered to remove insoluble matter. The final product is obtained in a substantially pure form by salting out again.

This product appears to be a new di-ester having the probable formula:

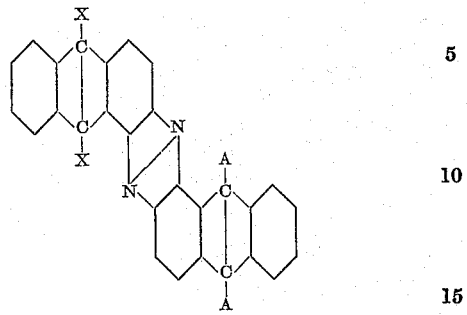

wherein one of the X's and one of the A's represents a sulphuric ester group, the other X and the other A representing OH.

It dissolves in water to give a red-brown solution which turns red on acidification with acetic acid in the cold and gives a blue precipitate on boiling. A blue precipitate is also at once obtained on acidification with hydrochloric acid in the cold.

*Example 8*

This is an example of the use in dyeing of the product of the previous example.

2 parts of a 10 per cent paste of the product of Example 7 are dissolved in 200 parts of water and 10 parts of cotton cloth is entered at 60° C. and worked at that temperature for 30 minutes. 10 parts of sodium chloride are then added to the dye bath and the dyeing continued for a further 30 minutes.

The cotton is thus colored a reddish brown which is changed to a bright blue by immersion in a 1 per cent solution of sulphuric acid at 15°. The blue shade is not so red as the shade of dianthraquinone dihydroazine and the body may be a dianthraquinone dihydroazine derivative. This appears to represent a simpler method of obtaining a dyeing of a dianthraquinone dihydroazine derivative than any previously described whether by the vat or soluble ester methods.

The insoluble matter obtained in Example 7 after dissolving the filter cake in warm water and filtering the solution, appears to be the vat dye corresponding to the soluble derivative used in the example above and it can be applied as a vat dyestuff by the ordinary alkaline hydrosulphite solution.

*Example 9*

10 parts of woolen cloth well wetted out are entered into the dye bath as used in Example 8, and the temperature raised to 70 to 75°. Exhaustion is effected by the cautious addition of dilute acetic acid.

The dyeing which already is somewhat blue in color towards the end of the process, is immersed for 5 minutes in a 1 per cent solution of sulphuric acid at 15°, when a bright blue shade is developed.

*Example 10*

In this example they carry the treatment of the tetra-sulphuric acid ester with a reducing agent in acid solution.

To 250 parts of liquor containing 40 parts of the potassium salt of the tetra-ester are added 20 parts of zinc dust. The mixture is stirred and 40 parts of acetic acid of 50 per cent strength are run in. The temperature is then raised to 80° C. for 15 minutes. The deep red solution, containing a product having the probable formula:

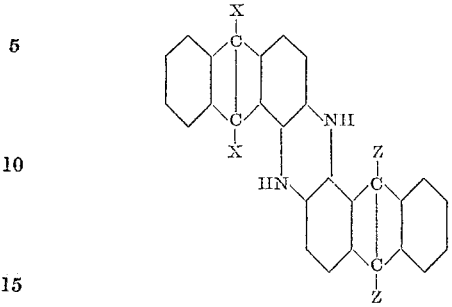

wherein one X and one Z each represent hydrogen and the other X and the other Z each represent O.SO$_3$Na, is cooled to 60° C., made alkaline with sodium carbonate and filtered from zinc residues.

On standing in air, the red color changes to brown. When this body is boiled with dilute hydrochloric acid, a brown substance is precipitated which dissolves in alkali to give a brown-purple solution.

Cotton is dyed a brown color by impregnating with the red solution, either before or after standing, and when the dyeing is boiled for 15 minutes in a solution containing 1 per cent each of copper sulphate and hydrochloric acid liquor, a blue shade is obtained.

Instead of dyeing as in the preceding paragraph, the alkaline solution of the body obtained in the last paragraph but one by acid treatment may be used. In this way cotton is dyed a purple-brown shade, becoming red on washing with water or acids and returning towards blue with alkalies.

The brown body obtained when deep red solution has been standing in air is apparently identical with that obtained by oxidation of 2-aminoanthranol ester by the process of U. S. Patent 1,970,033, August 14, 1934.

Example 11

This example illustrates the preparation of a trisulphuric ester from 3,3'-dichloro-dianthrahydroquinoneazine tetra-sulphuric ester in a manner analogous to the method of Example 6.

20 parts of a 25 per cent paste of the tetra-sulphuric ester of 3,3'-dichloro-tetrahydro-dianthraquinoneazine (potassium salt) are dissolved in 1000 parts of water at 5° C. To this a 20 per cent solution of acetic acid is added until the whole contains 0.4 per cent of acetic acid.

The color of the solution, originally yellow with a green fluorescence, rapidly changes towards red. The reaction is stopped, by making the solution alkaline with caustic soda, when no increase in the formation of red material is observed, but before the color begins to become purple red. The liquor is heated to 60° C. and salted out. The product so obtained appears to be the trisulphuric ester of dichloro-tetrahydro-dianthraquinoneazine. In order to purify it from some di-ester of dichloro-dihydro-dianthraquinone-dihydroazine, it is dissolved in about 100 parts of 1 per cent sodium carbonate solution at 50–60°, 5 per cent of sodium chloride is added and the liquor is filtered hot. The filtrate is salted out, giving the desired product.

The ester is red in color, and dissolves readily in water to give a carmine red solution. Caustic soda changes the color of the solution to purple. Mineral acid at once decomposes the compound to the blue disulphuric ester of dichloro-dihydro-dianthraquinone-dihydroazine. The ester is surprisingly stable in alkaline solution.

Example 12

50 parts of a 4.4 per cent paste of the sodium salt of the ester prepared in the previous example, together with 25 parts of water and 5 parts of 20 per cent caustic soda liquor, are warmed to 70° C. To the deep red solution there are added slowly while stirring 1.5 parts of potassium persulphate. After the addition is complete, 20 parts of saturated brine are added and the product filtered off and washed on the filter with brine.

The new product, having the probable formula:

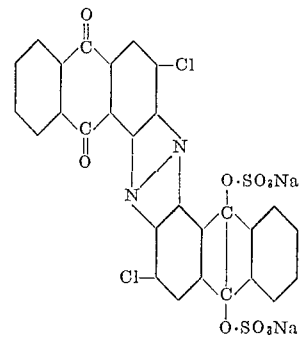

is a red soluble ester, similar in appearance to the starting material but sharply distinguished by its properties. Its solution in water is not colored violet by caustic alkali; on reduction with sulphide or hydrosulphite and alkali, the color of the solution changes to blue green. On treatment with dilute mineral acid the vat dyestuff, dichloro-indanthrone, is precipitated.

In place of persulphate, other alkaline oxidizing agents may be used, as for example, bleach liquor.

The corresponding unchlorinated ester may be produced in like manner by using as starting material the corresponding unchlorinated body.

Example 13

Cotton cloth is padded with concentrated solution of the ester prepared according to Example 12 at about 40° C., and then, with or without drying, passed through a ½ per cent solution of hydrochloric acid.

A deep bright blue shade immediately develops apparently corresponding to 3,3'-dichloro-indanthrone.

Example 14

This is a detailed example of the preparation referred to in the last paragraph of Example 12.

200 parts of a paste of the trisulphuric ester of tetrahydro-dianthraquinoneazine of strength 10 per cent (calculated as indanthrone) together with 400 parts of water and 50 parts of 20 per cent caustic soda solution are warmed to 50° C. and 12.5 parts of potassium persulphate are gradually added. When the addition is complete, the temperature is raised to 70° C. for half an hour. The liquor is then saturated with salt and filtered, the cake being washed with salt solution containing a little alkali.

The product, having the probable formula:

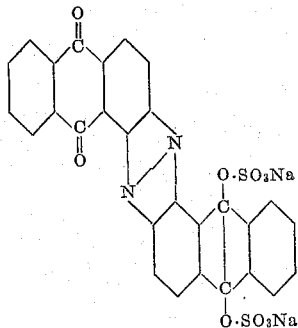

is a bright red body having good solubility. Its properties are similar to the corresponding chlorinated body.

The invention is not limited to the above examples and includes processes for the production of ester derivatives and processes for the use of those bodies, however made.

References to esters are not confined to the alkali salts but include the free acids and their salts including complex salts.

References to reduced bodies are not limited to bodies involving reduction of the carbonyl-oxygen to hydroxyl, but include further reduction products such as for example, groups to be found in bodies of anthranol type or their tautomeric anthrones.

The new bodies appear to be in all cases sulphuric esters. They may be of various shades, that for instance in Example 12 being of a reddish color. In some or in all cases, for instance, in the case of the example to which reference has just been made, they show good affinity for fibers and the resulting shades are converted instantaneously to what appear to be indanthrone dyes, on immersing in very dilute acid.

The advantages of the part of the process to which reference has just been made consist in or comprise the elimination of an oxidizing agent and in greater convenience in elaboration. This advantage is the more noticeable as indanthrone acids are among the more difficult of oxidation.

The invention contemplates the use in the art of coloring by means of the new bodies as referred to above however these may be prepared, and specific reference is made to their employment in the art of printing, especially in connection with the part of the process to which reference has just been made.

As regards use of the products, they are of general use in the arts of dyes and dyeing or coloring, this general use including dyeing, padding, printing, and pigmenting applied to any suitable product, for instance, cotton, wool, silk, and the usual fibers. The dyeing, or other treatment, consists in general of an impregnation followed by an after treatment of a hydrolytic nature, or of a combined oxidizing and hydrolytic nature.

As many apparently widely different embodiments of this invention may be made without departing from the spirit and scope thereof, it is to be understood that the inventors do not limit themselves to the specific embodiments thereof except as defined in the appended claims.

In this specification and claims, the term "indanthrone" is used in the broadest sense, that is, to include the azine and dihydroazine forms.

What is claimed:

1. As an improved dyestuff, useful in dyeing textile materials by the processes in which the development of final color is by acid hydrolysis and self-oxidation, the azine disulphuric esters of a reduced indanthrone, said azine di-esters reacting with dilute mineral acids to form dianthraquinone dihydroazine compounds.

2. As new and improved dyestuffs, an anthraquinone-anthrahydroquinoneazine disulphuric ester.

3. As a new and improved dyestuff, anthraquinone-anthrahydroquinoneazine disulphuric ester, said azine di-ester yielding di-anthraquinone dihydroazine upon treatment with dilute solutions of mineral acids.

4. As new and improved dyestuffs, 3,3'-dichloro-anthroquinone-anthrahydroquinoneazine disulpuhuric ester, said azine di-ester yielding 3,3'-dichloroindanthrone upon hydrolysis with dilute mineral acids.

DAVID ALEXANDER WHYTE FAIRWEATHER,
OLIVE MORGAN THOMAS,
For BARCLAYS BANK LD.,
    MANCHESTER TRUSTEE DEPT.,
THOMAS ERIC SONE,
          Manager.

*Executors of the Estate of John Thomas, Deceased*